United States Patent
Eguchi et al.

(12)

(10) Patent No.: US 6,172,889 B1
(45) Date of Patent: Jan. 9, 2001

(54) INVERTER APPARATUS ISLANDING OPERATION DETECTING METHOD AND INVERTER APPARATUS CAPABLE OF SURELY DETECTING AN ISLANDING OPERATION WITH A SIMPLE CONSTRUCTION

(75) Inventors: Masaki Eguchi, Uji; Hirokazu Kodama, Gojo; Tsukasa Takebayashi; Hirofumi Nakata, both of Yamatotakada, all of (JP)

(73) Assignee: Sharp Kabushiki Kaisha, Osaka (JP)

( * ) Notice: Under 35 U.S.C. 154(b), the term of this patent shall be extended for 0 days.

(21) Appl. No.: 08/865,349

(22) Filed: May 29, 1997

(30) Foreign Application Priority Data

May 29, 1996 (JP) .................................... 8-134656

(51) Int. Cl.⁷ .................................................. H02M 3/24
(52) U.S. Cl. ............................................. 363/95; 363/55
(58) Field of Search .............................. 363/55, 95, 96, 363/97, 131, 74

(56) References Cited

U.S. PATENT DOCUMENTS 4,878,208 * 10/1989 Seki et al. ..................... 323/207 X
5,327,336 * 7/1994 Ohkubo et al. ..................... 363/97
5,493,485 * 2/1996 Okado ................................. 363/56

FOREIGN PATENT DOCUMENTS

| 432 269 A1 | 6/1991 | (EP) . |
| 444 666 A2 | 9/1991 | (EP) . |
| 612 133 A1 | 8/1994 | (EP) . |
| A-6311653 | 11/1994 | (JP) . |

\* cited by examiner

*Primary Examiner*—Shawn Riley
*Assistant Examiner*—Y. J. Han

(57) ABSTRACT

There is provided an inverter apparatus islanding operation detecting method capable of surely detecting an islanding operation with a simple construction. A distortion for causing a variation in an output frequency of an inverter apparatus in an islanding operation stage is applied to an inverter output waveform. With this arrangement, even when the inverter apparatus is disconnected from an AC power system in a state in which a power factor of a load impedance is proximate to one, a frequency variation is generated in an inverter output, thereby ensuring detection of the islanding operation.

18 Claims, 10 Drawing Sheets

$m = \text{int}(g\_rate \times g\_count)$ g_rate : Increase rate
g_count : Count value of counter incremented every sampling
m: Read address of PWM data
$D_{Pm}$ : PWM data value

INVERTER APPARATUS ISLANDING OPERATION DETECTING METHOD AND INVERTER APPARATUS CAPABLE OF SURELY DETECTING AN ISLANDING OPERATION WITH A SIMPLE CONSTRUCTION

BACKGROUND OF THE INVENTION

1. Field of the Invention

The present invention relates to an inverter apparatus for supplying a power to a load the inverter apparatus being in interconnection with an AC power system. The present invention also relates to an inverter apparatus islanding operation detecting method for detecting the event that the inverter apparatus has started an islanding operation as dissociated from the AC power system due to a power failure or the like of the AC power system.

2. Description of the Background Art

Conventionally, there has been an inverter apparatus as shown in FIG. 14. This inverter apparatus 100 subjects a DC power inputted from a DC power source 101 to PWM (Pulse Width Modulation) control in an inverter main circuit 102, thereby converting the DC power into an AC power. Then, after a high-frequency component is removed from the converted AC power by a filter comprised of a reactor 103 and a capacitor 104, the resulting AC power is supplied to a load 105. The load 105 is further supplied with an AC power from an AC power system 108 via a breaker 106 and a pole transformer 107, so that the inverter apparatus 100 is operated in interconnection with the AC power system 108.

The inverter main circuit 102 is subjected to the PWM control as follows. That is, a load supply voltage $V_o$ supplied to the load 105 is detected by a voltage detector 109. Then, the detected load supply voltage $V_o$ is inputted to a band-pass filter 110 to pass through it and made to be a sine wave signal Va which is inputted to a current reference generator circuit 111. The current reference generator circuit 111 multiplies the inputted sine wave signal Va by an output command signal Vc so as to generate a current reference signal Ic and input it to an error amplifier circuit 112.

On the other hand, an output current $I_o$ of the inverter main circuit 102 is detected by a current detector 113 and inputted to the error amplifier circuit 112. The error amplifier circuit 112 generates an error amplification signal E based on the inputted current reference signal Ic and the output current $I_o$ and inputs it to a PWM control circuit 114. The PWM control circuit 114 generates a gate pulse signal Gp by executing a pulse width modulation process based on the inputted error amplification signal E and inputs it to a gate drive circuit 115. The gate drive circuit 115 switchingly controls switching elements (not shown) constituting the inverter main circuit 102 by the inputted gate pulse signal Gp, thereby converting the DC power of the DC power source 101 into an AC power.

The inverter apparatus 100 detects the event that the inverter apparatus has entered into an islanding operation state as follows. It is to be noted that the islanding operation means a state in which the DC power source 101 (e.g., a solarlight power generation system) continues supplying a DC power when the AC power system 108 fails.

When the inverter apparatus 100 enters into the islanding operation state, a voltage abnormality and a frequency abnormality occur in the load supply voltage $V_o$ supplied to the load 105. This is for the reasons as follows. That is, the amplitude and phase of the current reference signal Ic relative to the load supply voltage $V_o$ are as shown in FIGS. 15A and 15B due to the transfer characteristics of the band-pass filter 110. Therefore, when the breaker 106 is opened thereby making the inverter apparatus 100 enter into the islanding operation state and when a reactive power supplied from the inverter apparatus 100 and a reactive power required by the load 105 do not coincide with each other, the output of the inverter apparatus 100 (referred to as an inverter output hereinafter) exhibits variations such as (i) deviation of its frequency from the rated frequency (e.g., 50/60 Hz when the AC power system 108 is the commercial power source) $f_o$, (ii) reduction of its current value, and (iii) reduction of its voltage value. For example, in the case where the load impedance of the inverter apparatus 100 when it enters into the islanding operation state has a delayed phase φ as shown in FIG. 15B, the frequency of the inverter output balances when it is increased up to $f_1$. In this stage, the current value of the inverter output reduces from $I_0$ to $I_1$, and the voltage value reduces in accordance with it.

Therefore, this inverter apparatus 100 is provided with a voltage abnormality detector circuit 116 and a frequency abnormality detector circuit 117 for the detection of the voltage abnormality and the frequency abnormality of the load supply voltage $V_o$ and decides whether or not the inverter apparatus 100 has entered into the islanding operation according to the result of detection. Based on the result of decision, the operation of the gate drive circuit 115 is stopped, so that the output of the inverter main circuit 102 is stopped and the DC power source 101 is disconnected from the AC power system 108 by a system linking relay (not shown) of the inverter main circuit 102, thereby preventing the islanding operation of the inverter apparatus 100.

However, the background art inverter apparatus 100 that prevents the islanding operation in the aforementioned manner has had the problem that the frequency variation and the voltage variation of the inverter output reduce when the power factor of the load impedance of the inverter output is proximate to one, causing the islanding operation state to be hardly detected by the voltage abnormality detector circuit 116 or the frequency abnormality detector circuit 117.

For the above reasons, there has been conventionally proposed a method for detecting the islanding operation state by detecting a distortion generated in the output waveform of the inverter output in the islanding operation state. This is as follows. That is, when the inverter apparatus 100 enters into the islanding operation state, an excitation current is supplied from the inverter apparatus 100 to the pole transformer 107, and this excitation current causes a distortion at or around the zero-crossing point of the output waveform of the inverter output supplied to the load 105. Therefore, by measuring the distortion and a rate of change of the distortion, the islanding operation state is detected.

However, in order to detect the islanding operation in a manner as described above, it is required to newly provide a circuit for detecting the distortion and the rate of change of the distortion. This has caused an increase in number of the components and a complication of the construction of the inverter apparatus, which has been a factor for increasing the cost of the inverter apparatus.

SUMMARY OF THE INVENTION

The object of the present invention is therefore to allow the islanding operation to be surely detected simply and at low cost even when the power factor of the inverter output with respect to the load impedance is proximate to one.

In order to achieve the aforementioned object, the present invention provides an inverter apparatus islanding operation detecting method for detecting an event when an inverter apparatus, which converts an output of a direct current power source into an alternating current through waveform control synchronized with a zero-crossing point and supplies the alternating current to a load in interconnection with an alternating current power system, has been dissociated from the alternating current power system and has started an islanding operation, comprising:

imparting to an inverter output waveform a distortion for causing a variation in an output frequency in an islanding operation stage of the inverter apparatus, and detecting the islanding operation of the inverter apparatus by detecting a frequency variation of an inverter output caused by the distortion or a variation attributed to the frequency variation.

Also, the present invention provides an inverter apparatus having: an inverter main circuit for converting an output of a direct current power source into an alternating current and supplying the alternating current to a load in interconnection with an alternating current power system; an inverter control system for controlling the converting operation of the inverter main circuit by waveform control synchronized with a zero-crossing point of an inverter output; and an islanding operation detecting system for detecting an islanding operation of the inverter main circuit by detecting a frequency variation generated in the inverter output when the inverter main circuit is dissociated from the alternating current power system and enters into the islanding operation state or a variation attributed to the frequency variation, the inverter apparatus comprising:

a distortion imparting system for imparting a distortion for causing a variation in an output frequency of the inverter main circuit in an islanding operation stage.

According to the present invention, the inverter output waveform is provided with the distortion for causing the variation in the output frequency when the inverter apparatus is in the islanding operation stage. Therefore, a frequency variation is surely generated in the inverter output when the inverter apparatus is disconnected from the AC power system even when the power factor of the load impedance of the inverter output is proximate to one.

In an embodiment, the distortion imparting system imparts the distortion to the zero-crossing point and its proximity.

According to the above embodiment, the distortion is given to the zero-crossing point and its proximity of the inverter output waveform, and therefore, the frequency variation is surely generated in the inverter output.

In an embodiment, the distortion imparting system intermittently provides a distortion non-impartation period.

According to the above embodiment, the distortion non-impartation period is intermittently provided. Therefore, in the normal operating state of the inverter apparatus, i.e., in the state in which the inverter apparatus is operating at a rated frequency in liaison with the AC power system, the distortion scarcely influences the load supply voltage.

In an embodiment, the distortion imparting system imparts to an inverter output waveform a distortion which causes a zero output level in a specified interval that terminates at the zero-crossing point.

According to the above embodiment, a zero-crossing point detection timing of the inverter output waveform is advanced when the inverter apparatus is disconnected from the AC power system, and the frequency of the inverter output to be subjected to waveform control in synchronization with this timing increases.

In an embodiment, the distortion imparting system imparts to an inverter output waveform a distortion which yields an output on a descending side of the waveform extending from a peak of the waveform to the zero-crossing point.

According to the above embodiment, the zero-crossing point detection timing of the inverter output waveform is retarded when the inverter apparatus is disconnected from the AC power system, and the frequency of the inverter output to be subjected to waveform control in synchronization with this timing decreases.

In an embodiment, the distortion imparting system imparts to an inverter output waveform a distortion which causes a zero output level in a specified interval including the zero-crossing point and its both sides.

According to the above embodiment, the zero-crossing point detection timing of the inverter output waveform is varied when the inverter apparatus is disconnected from the AC power system, and the frequency of the inverter output to be subjected to waveform control in synchronization with this timing varies.

In an embodiment, the distortion imparting system imparts to an inverter output waveform a distortion which yields outputs respectively increased into wave peak sides of the waveform in both sides of the zero-crossing point.

According to the above embodiment, the zero-crossing point detection timing of the inverter output waveform is retarded when the inverter apparatus is disconnected from the AC power system, and the frequency of the inverter output to be subjected to waveform control in synchronization with this timing decreases.

In an embodiment, the distortion imparting system alternately repetitively imparts to an inverter output waveform a first distortion which causes the output frequency of the inverter main circuit to increase in the islanding operation stage and a second distortion which causes the output frequency of the inverter main circuit to decrease in the islanding operation stage.

The above embodiment has the following effects. That is, the inverter output frequency in the islanding operation stage is also influenced by the type of the load connected to the inverter apparatus. The inverter output frequency increases when the load is an inductive load, and the inverter output frequency decreases when the load is a capacitive load. Therefore, in the case where the amount of the frequency variation due to the distortion imparting system and the amount of the frequency variation due to the load have absolute values equivalent to each other and opposite directions of variation or in a similar case, the frequency variation due to the distortion imparting system and the frequency variation due to the load sometimes cancel each other, therefore hardly causing a frequency variation.

However, according to the present embodiment, the first distortion and the second distortion are alternately imparted to the inverter output, and therefore, the inverter output frequency alternately increases and decreases repetitively. Accordingly, even though the frequency varying effect due to the distortion imparting system and the frequency varying effect due to the load cancel each other in a certain period, they stop cancelling each other in the next period, and therefore, the inverter output frequency surely varies.

Also, the present invention provides an inverter apparatus having: an inverter main circuit for converting an output of a direct current power source into an alternating current and supplying the alternating current to a load in interconnection with an alternating current power system; an inverter control system for controlling the converting operation into the alternating current of the inverter main circuit by waveform control synchronized with a zero-crossing point of an inverter output; and an islanding operation detecting system for detecting an islanding operation of the inverter main circuit by detecting a frequency variation generated in the inverter output when the inverter main circuit is dissociated from the alternating current power system and enters into the islanding operation state or a variation attributed to the frequency variation, the inverter apparatus comprising:

a distortion imparting system for imparting a distortion to an inverter output waveform so that an inverter output frequency varies in a positive feedback loop according to the frequency variation of the inverter output.

According to the invention, a distortion is imparted to the inverter output waveform so that the inverter output frequency varies in a positive feedback loop according to the frequency variation of the inverter output, and therefore, the inverter output frequency varies speedily.

An embodiment comprises a gain adjusting system for increasing a gain of the positive feedback loop of the distortion imparting system when the islanding operation detecting system detects an event that the inverter output frequency is staying in an abnormal frequency region.

According to the above embodiment, when the islanding operation detecting system detects the event that the inverter output frequency is staying in the abnormal frequency region, the gain adjusting system increases the gain of the positive feedback loop of the distortion imparting system, and therefore, the inverter output frequency varies more speedily.

In an embodiment, the distortion imparting system has a dead band in the positive feedback loop at and around a rated frequency, and alternately repetitively imparts in the dead band to the inverter output waveform a first distortion which causes the output frequency of the inverter main circuit to increase in the islanding operation stage and a second distortion which causes the output frequency of the inverter main circuit to decrease in the islanding operation stage.

According to the above embodiment, the first distortion and the second distortion are alternately imparted to the inverter output in the dead band. Therefore, the inverter output frequency alternately increases and decreases repetitively even in the dead band in which the frequency is stabilized, so that the frequency shifts into the region in which a frequency variation occurs in the positive feedback loop. Therefore, in the islanding operation, the frequency comes to vary speedily even though the inverter output frequency is within the dead band.

In an embodiment, the inverter control system forms PWM data through pulse width modulation based on a component of an error between a current reference and the inverter output and controls the inverter output according to the formed PWM data, and the distortion imparting system imparts a distortion to the current reference to impart the distortion to the inverter output waveform.

According to the above embodiment, in the pulse width modulation based on the error component between the current reference and the inverter output, the above distortion is imparted to the current reference. By this operation, a distortion is generated also in the PWM data formed through the pulse width modulation. In the islanding operation stage, a variation is surely generated in the inverter output frequency due to a distortion generated in the PWM data.

In an embodiment, the inverter control system forms PWM data through pulse width modulation based on a component of an error between a current reference and the inverter output and controls the inverter output according to the formed PWM data, and the distortion imparting system imparts a distortion to the PWM data to impart the distortion to the inverter output waveform.

According to the above embodiment, the distortion imparting system directly imparts the distortion to the PWM data, and therefore, a variation is speedily generated in the inverter output frequency.

An embodiment comprises an output reducing system for reducing the inverter output when the islanding operation detecting system detects an event that the inverter output frequency is deviated from the rated frequency.

According to the above embodiment, the inverter output is reduced when the inverter output frequency is deviated from the rated frequency, and therefore, the variation of the inverter output frequency is promoted.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Preferred embodiments of the present invention will be described in detail below with reference to the accompanying drawings.

Figure 1:
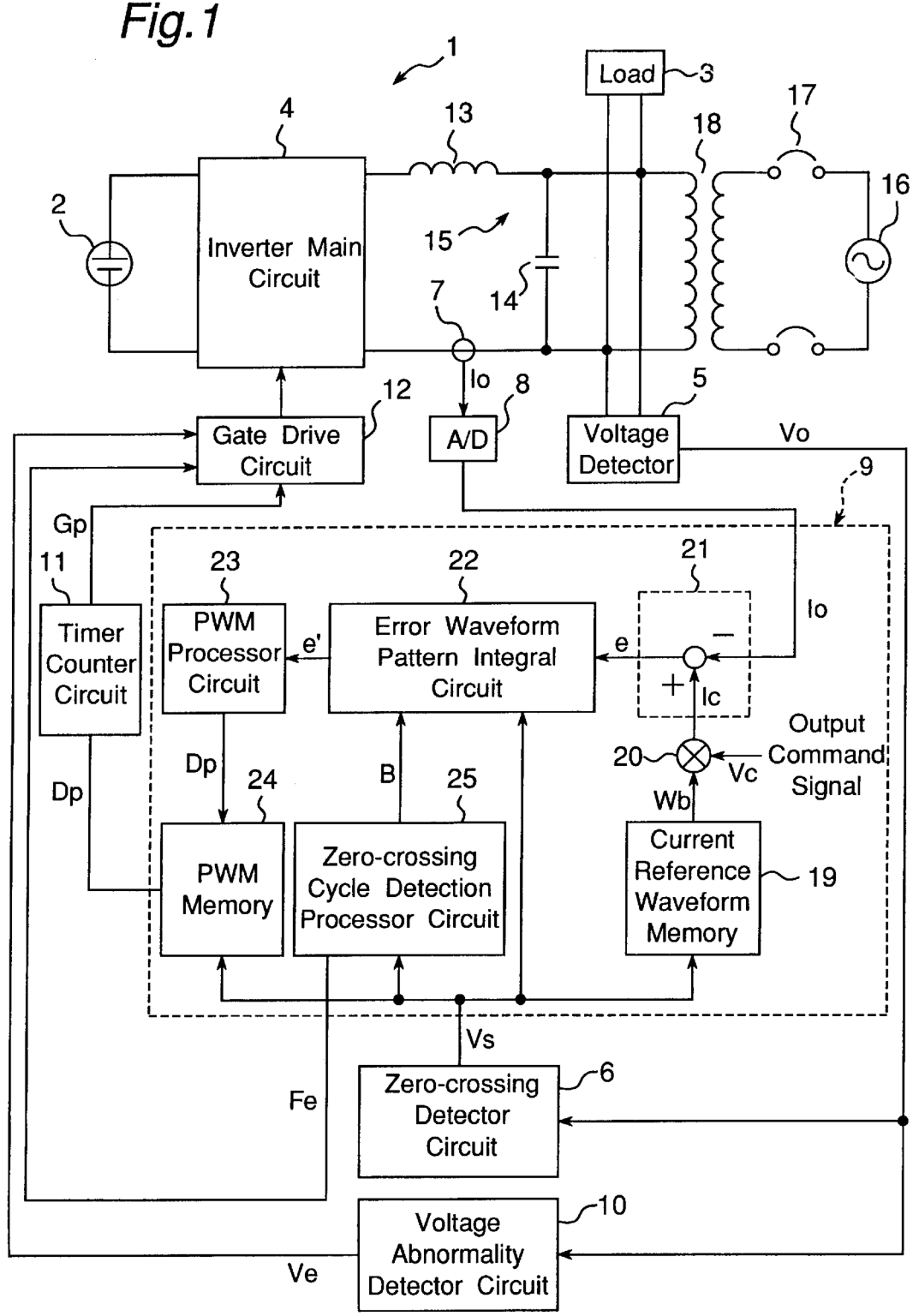
FIG. 1 is a block diagram showing the construction of an inverter apparatus according to a first embodiment of the present invention.

FIG. 1 is a block diagram showing the construction of an inverter apparatus 1 according to a first embodiment of the present invention. The inverter apparatus 1 comprises: an inverter main circuit 4 which converts a DC power inputted from a DC power source 2 into an AC power and supplies it to a load 3; a voltage detector 5 which detects a load supply voltage $V_o$ supplied to the load 3; a zero-crossing detector circuit 6 which generates an output synchronization signal Vs based on the load supply voltage $V_o$; a current detector 7 which detects an output current $I_o$ of an AC output (referred to as an inverter output hereinafter) of the inverter main circuit 4; an A/D converter 8 which subjects the output current $I_o$ to an analog-to-digital conversion process; a DSP (Digital Signal Processor) 9 which subjects the inverter main circuit 4 to PWM (Pulse Width Modulation) control on the basis of the output current $I_o$ and the output synchronization signal Vs; a voltage abnormality detector circuit 10 which detects a voltage abnormality of the load supply voltage $V_o$ supplied to the load 3; a timer counter circuit 11 which generates a gate pulse signal Gp based on PWM data outputted from the DSP 9; and a gate drive circuit 12 which executes switching control of switching elements (not shown) of the inverter main circuit 4 based on the gate pulse signal Gp. Between the inverter main circuit 4 and the load 3 is provided a filter 15 which is comprised of a reactor 13 and a capacitor 14 and removes a high-frequency component of the inverter output.

The load 3 is further supplied with an AC power from an AC power system 16 via a breaker 17 and a pole transformer 18 independently of the inverter apparatus 1, and the inverter apparatus 1 is operated in interconnection with the AC power system 16.

The above DSP 9 comprises: a current reference waveform memory 19 which stores therein current reference waveform data $W_b$; a multiplying section 20 which successively reads the current reference waveform data $W_b$ from the current reference waveform memory 19 and generates a current reference signal Ic by multiplying it by an output command signal Vc; an error signal generating section 21 which generates a current error signal e by calculating an error between the output current $I_o$ and the current reference signal Ic; an error waveform pattern integral circuit 22 which executes a waveform pattern integration process of the current error signal e with the cycle of the output synchronization signal Vs being one interval; a PWM processor circuit 23 which generates a PWM data $D_p$ by processing integral data e' outputted from the error waveform pattern integral circuit 22 for a pulse width modulation process; a PWM memory 24 which stores therein the PWM data $D_p$; and a zero-crossing cycle detection processor circuit 25 which calculates the frequency of the load supply voltage $V_0$, compares the frequency with a threshold value so as to output a frequency abnormality signal $F_e$ representing the frequency abnormality of the load supply voltage $V_o$ and outputs a non-integral interval designation signal B.

The operation of this inverter apparatus will be described below in sequence. The output current $I_o$ of the inverter output detected by the current detector 7 is subjected to an analog-to-digital conversion process by the A/D converter 8 and then inputted to the error signal generating section 21.

On the other hand, the load supply voltage $V_o$ detected by the voltage detector 5 is inputted to the zero-crossing detector circuit 6. The zero-crossing detector circuit 6 detects the zero-crossing of the inputted load supply voltage $V_o$, generates the output synchronization signal Vs based on the zero-crossing and outputs the signal to the current reference waveform memory 19. The current reference waveform memory 19 reads the stored current reference waveform data $W_b$ in synchronization with the synchronization signal Vs and outputs the data to the multiplying section 20. The multiplying section 20 generates the current reference signal Ic by multiplying the inputted current reference waveform data $W_b$ by the output command signal Vc and outputs the signal to the error signal generating section 21.

The error signal generating section 21 which receives the output current $I_o$ and the current reference signal Ic generates the current error signal e that is the error between the output current $I_o$ and the current reference signal Ic and outputs the signal to the error waveform pattern integral circuit 22. The error waveform pattern integral circuit 22 receives the output synchronization signal Vs from the zero-crossing detector circuit 6, and the error waveform pattern integral circuit 22 integrates the waveform pattern of the current error signal e with the cycle of the output synchronization signal Vs served as one interval. The thus generated integral data e' is stored into the error waveform pattern integral circuit 22 for use in an integral calculation in the next sampling stage, and it is also outputted to the PWM processor circuit 23.

The PWM processor circuit 23 subjects the inputted integral data e' to a pulse width modulation process for generating the PWM data $D_p$ and then stores the PWM data $D_p$ into the PWM memory 24. The PWM memory 24 outputs every sampling time the PWM data $D_p$ to the timer counter circuit 11 in synchronization with the output synchronization signal Vs inputted from the zero-crossing detector circuit 6.

The timer counter circuit 11 generates a gate pulse signal Gp based on the PWM data $D_p$ generated according to the aforementioned procedure in the DSP 9 and outputs the signal Gp to the gate drive circuit 12. The gate drive circuit 12 switchingly controls the switching elements (not shown) of the inverter main circuit 4 based on the inputted gate pulse signal Gp, thereby driving the inverter main circuit 4.

This inverter apparatus 1 detects the islanding operation state as follows upon entering the islanding operation state due to a power failure of the AC power system 16 or the like, stopping the inverter output. That is, when the inverter apparatus 1 enters into the islanding operation state in a state in which the reactive power supplied from the inverter apparatus 1 and the reactive power required by the load 3 are not coinciding with each other, the frequency of the load supply voltage $V_o$ (which becomes equal to the inverter output in the islanding operation state) varies from the rated frequency (50/60 Hz), in accordance with which the voltage value of the load supply voltage $V_o$ varies. Therefore, the voltage abnormality detector circuit 10 compares the load supply voltage $V_o$ with a threshold value so as to detect whether or not the load supply voltage $V_o$ has an abnormality. When an excessive voltage abnormality or an insufficient voltage abnormality occurs in the load supply voltage $V_o$, a voltage abnormality signal $V_e$ is outputted to the gate drive circuit 12. Further, the zero-crossing cycle detection processor circuit 25 detects the frequency of the load supply voltage $V_o$ and compares the detected frequency of the load supply voltage $V_o$ with a rated frequency $f_o$ so as to calculate a deviation from each other. When the calculated deviation exceeds a predetermined threshold value, the frequency abnormality signal $F_e$ is outputted to the gate drive circuit 12.

When the voltage abnormality signal $V_e$ or the frequency abnormality signal $F_e$ are inputted to the gate drive circuit 12, the gate drive circuit 12 decides that inverter apparatus has entered into the islanding operation state and stops the switching control of the inverter main circuit 4, by which the inverter main circuit 4 stops outputting the inverter output.

An operation characteristic of this inverter apparatus 1 will be described next. When the inverter apparatus 1 enters into the islanding operation state in a state in which the reactive power supplied from the inverter apparatus 1 and the reactive power required by the load 3 are approximately coinciding with each other (when the power factor of the load impedance is proximate to one), the frequency of the load supply voltage $V_o$ scarcely varies. Consequently, the abnormality of the load supply voltage $V_o$ can be detected neither by the voltage abnormality detector circuit 10 nor the zero-crossing cycle detection processor circuit 25. Therefore, this inverter apparatus 1 imparts a distortion as described below to the integral data e' of the error waveform pattern e to generate a variation in the frequency of the load supply voltage $V_o$ in the islanding operation state regardless of the power factor of the load impedance, thereby surely detecting the islanding operation state. The impartation of the distortion will be described in detail below.

The zero-crossing cycle detection processor circuit 25 imparts a non-integral interval designation signal B to the error waveform pattern integral circuit 22. The non-integral interval designation signal B is a signal for executing a designation as follows. That is, the non-integral interval designation signal B is a command signal for designating a specified interval α of the waveform pattern of the integral data e' and zeroing the output in the specified interval α. In this case, the specified interval α is an interval provided within a waveform pattern half cycle with the zero-crossing point located at the terminal end of the interval.

Figure 2A:
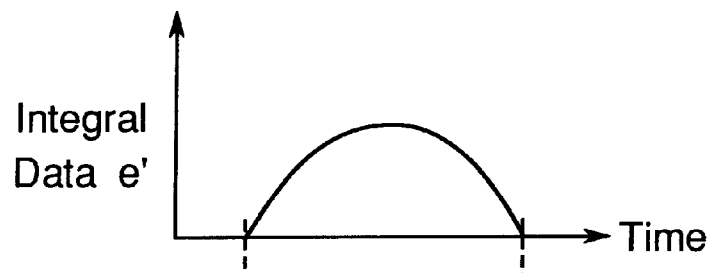
FIGS. 2A, 2B and 2C are graphs showing apparent waveform patterns of integral data in the inverter apparatus of the first embodiment.
Figure 2B:
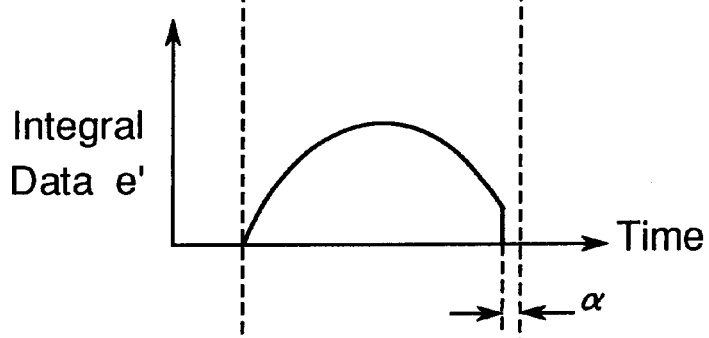
Figure 2C:
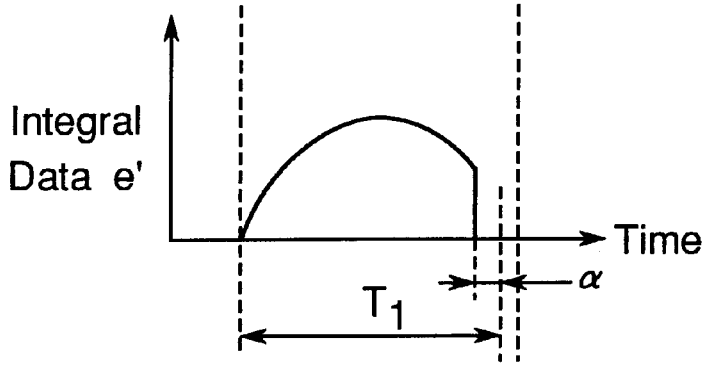
Figure 3A:
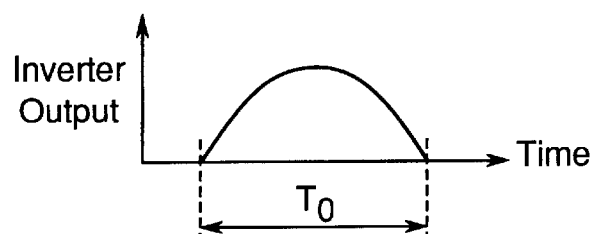
FIGS. 3A, 3B and 3C are graphs showing waveform patterns of the inverter output controlled on the basis of the integral data shown in FIGS. 2A, 2B and 2C.
Figure 3B:
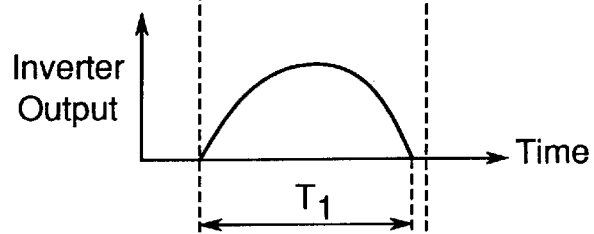
Figure 3C:
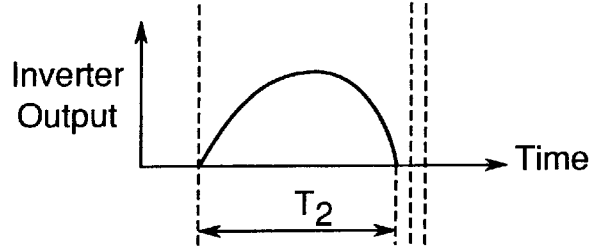

The operation of the error waveform pattern integral circuit 22 which receives the non-integral interval designation signal B will be described with reference to FIGS. 2A, 2B, 2C, 3A, 3B and 3C. FIGS. 2A, 2B and 2C are examples of the integral data e', while FIGS. 3A, 3B and 3C are exemplified waveform patterns of the inverter output generated on the basis of the integral data e' shown in FIGS. 2A, 2B and 2C. Further, FIGS. 2A, 2B, 2C, 3A, 3B and 3C are data of a half cycle, and the number of pieces of data at the rated frequency is set to 300 in FIGS. 2A, 2B and 2C.

When the inverter output is maintaining the rated frequency $f_o$, the waveform pattern of the integral data e' in the preceding cycle stored in the error waveform pattern integral circuit 22 comes to have, for example, a sine waveform having a cycle $T_0$ as shown in FIG. 2A. Further, a cycle waveform of the inverter output generated on the basis of the integral data e' having this sine waveform also comes to have a sine waveform having a cycle $T_0$ as shown in FIG. 3A.

In this case, the error waveform pattern integral circuit 22 into which the non-integral interval designation signal B is inputted from the zero-crossing cycle detection processor circuit 25 outputs integral data e' as shown in FIG. 2B where the integral data in the specified interval α designated by the non-integral interval designation signal B of the integral data e' having the cycle $T_0$ is zeroed. The apparent cycle of the integral data e' is shorter than the cycle of the rated frequency $f_o$. Therefore, when the inverter main circuit 4 generates an inverter output based on this integral data e', the detection timing of the zero-crossing point is advanced by the interval α, and consequently, the cycle becomes $T_1$ that is slightly shorter than the cycle $T_0$ as shown in FIG. 3B, so that the frequency of the inverter output is slightly increased.

Further, when an inverter output having a frequency corresponding to the cycle $T_1$ is output, the error waveform pattern integral circuit 22 outputs integral data e' shown in FIG. 2C where the integral data in the specified interval α designated by the non-integral interval designation signal B is zeroed. The apparent cycle of this integral data e' is made shorter than the period $T_1$. Therefore, when the inverter output is generated on the basis of this integral data e', the detection timing of the zero-crossing point is further advanced by the interval α, and consequently, its cycle becomes $T_2$ that is shorter than $T_1$ as shown in FIG. 3C, so that the frequency of the inverter output is further slightly increased. In the above manner, the frequency of the inverter output will gradually increase.

The above frequency variation occurs even when the power factor of the load impedance is approximately one. Therefore, by detecting such a frequency variation or a voltage variation attendant on the frequency variation by the zero-crossing cycle detection processor circuit 25 or the voltage abnormality detector circuit 10, the islanding operation is surely detected. It is to be noted that the length of the specified interval α is adjusted by the zero-crossing cycle of the load supply voltage $V_o$.

Further, such a frequency variation occurs only when the inverter apparatus 1 is in the islanding operation. When the inverter apparatus 1 is operating in interconnection with the AC power system 16, the frequency variation does not occur since the frequency of the load supply voltage $V_o$ is maintained on the AC power system 16 side.

Figure 4:
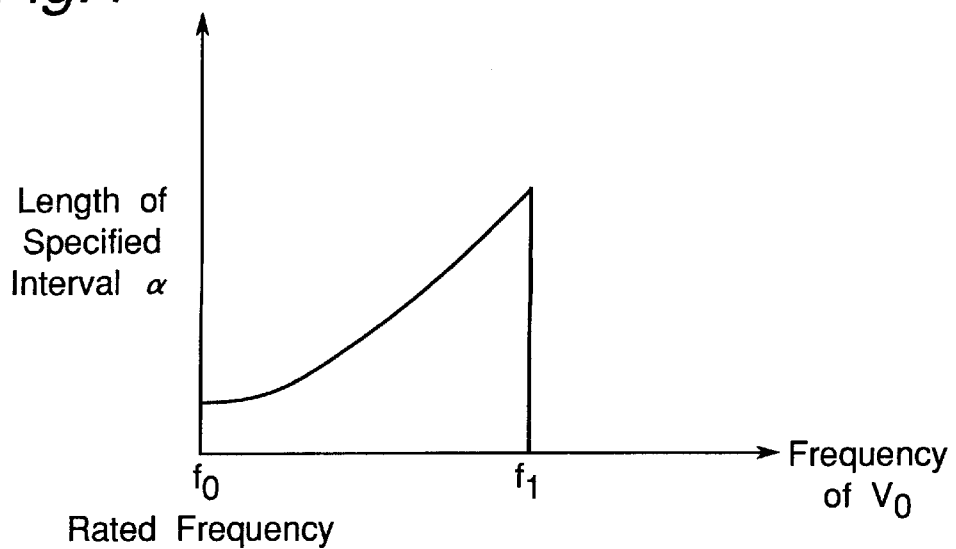
FIG. 4 is a graph showing a relation between a specified interval α and a load supply voltage frequency.

The zero-crossing cycle detection processor circuit 25 varies the length of the specified interval α in which the integral data e' is zeroed as follows. That is, as shown in FIG. 4, the length of the specified interval α is reduced when the frequency of the load supply voltage $V_o$ in the islanding operation stage is in the proximity of the rated frequency $f_o$, and the specified interval α is increased accordingly as the frequency of the inverter output deviates from the rated frequency $f_o$. With this arrangement, the distortion occurring in the load supply voltage $V_o$ is reduced in the interval in which the linkage with the AC power system 16 is maintained, and the frequency variation of the inverter output is accelerated when the inverter apparatus is dissociated from the system and put in the islanding operation state, thereby further ensuring the detection of the islanding operation state.

In the zero-crossing cycle detection processor circuit 25, the specified interval α is made to return to zero when the frequency of the load supply voltage $V_o$ in the islanding operation state reaches an upper limit value $f_1$ similarly as shown in FIG. 4. With this arrangement, when the frequency of the inverter output reaches $f_1$ in the islanding operation stage, the specified interval α is zeroed to prevent the upper frequency from increasing in excess of $f_1$, by which a possible frequency divergence is prevented.

Further, in the zero-crossing cycle detection processor circuit 25, the value of the integral data e' is reduced at a specified rate when the frequency of the load supply voltage $V_o$ is deviated from the rated frequency $f_o$ of the AC power system, thereby reducing the inverter output. By this operation, in the islanding operation stage, the frequency variation of the inverter output is promoted for advancing the detection of the islanding operation and safely stopping the operation of the inverter apparatus 1.

Figure 5:
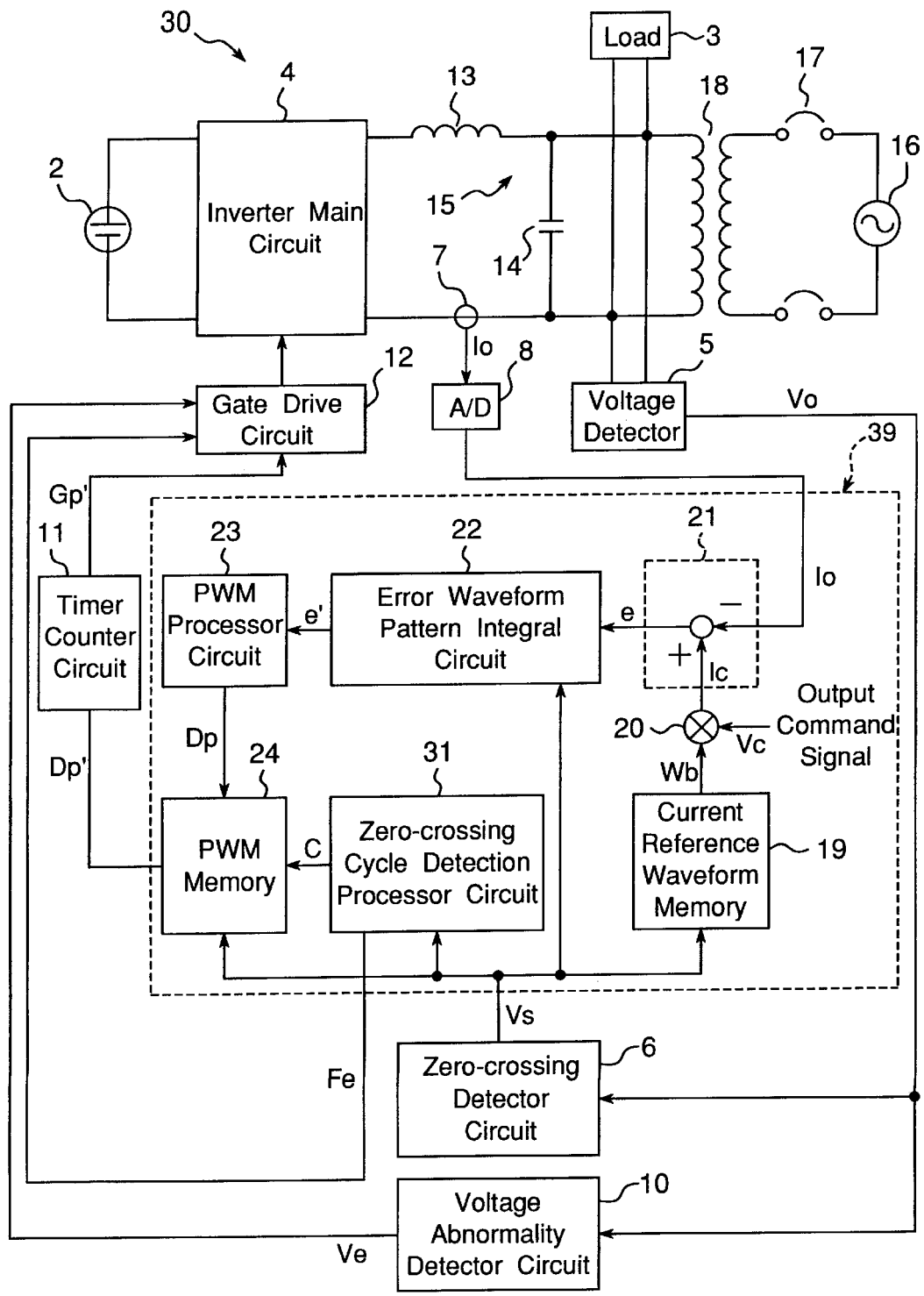
FIG. 5 is a block diagram showing the construction of an inverter apparatus according to a second embodiment of the present invention.

FIG. 5 is a block diagram showing the construction of an inverter apparatus 30 according to a second embodiment of the present invention. The inverter apparatus 30 basically has a construction similar to that of the inverter apparatus 1 of the first embodiment. Therefore, the same or similar components are denoted by the same reference numerals, and no description is provided for them since reference should be made to the description of the first embodiment.

This inverter apparatus 30 is characterized by the construction of a zero-crossing cycle detection processor circuit 31 in a DSP 39 for imparting a distortion to the inverter output. That is, this zero-crossing cycle detection processor circuit 31 outputs a read address designation signal C to the PWM memory 24 in addition to the calculation of the frequency of the load supply voltage $V_o$ and the outputting of the frequency abnormality signal $F_e$ that is obtained by comparing the frequency with a threshold value and represents the frequency abnormality of the load supply voltage $V_o$. The zero-crossing cycle detection processor circuit 25 of the first embodiment outputs the non-integral interval designation signal B to the error waveform pattern integral circuit 22. In this point, they are different from each other.

The operation characteristic of this inverter apparatus 30 will be described next. When the inverter apparatus 30 enters into the islanding operation state in a state in which the reactive power supplied from the inverter apparatus 30 and the reactive power required by the load 3 are approximately coinciding with each other (when the power factor of the load impedance is proximate to one), the frequency of the load supply voltage $V_o$ scarcely varies. Consequently, the abnormality of the load supply voltage $V_o$ can be detected neither by the voltage abnormality detector circuit 10 nor the zero-crossing cycle detection processor circuit 31. Therefore, this inverter apparatus 30 generates a variation in the frequency of the load supply voltage $V_o$ in the islanding operation state regardless of the power factor of the load impedance by imparting a distortion as described below to PWM data $D_p'$ outputted from the PWM memory 24, thereby surely detecting the islanding operation state. The impartation of the distortion will be described in detail below.

Figure 6:
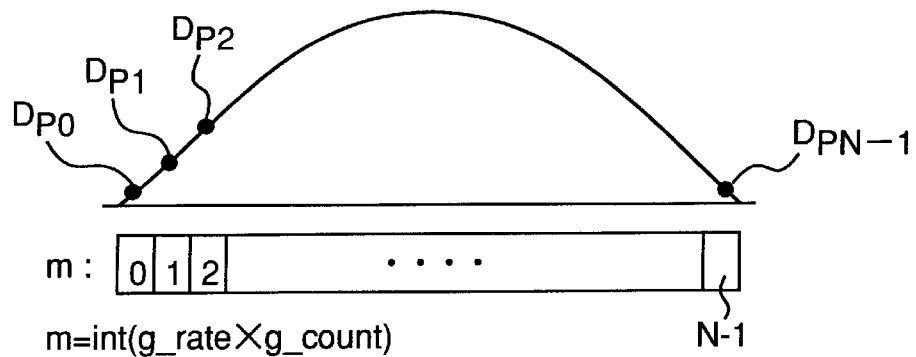
FIG. 6 is a chart for explaining how to distort PWM data.

The read address designation signal C given from the zero-crossing cycle detection processor circuit 31 to the PWM memory 24 is a signal for executing the following designation. That is, as shown in FIG. 6, the read address designation signal C imparts a distortion to the PWM data $D_p'$ read from the PWM memory 24 by changing every zero-crossing cycle a growth rate (g_rate) of a count value (g_count) of a counter for reading provided in the zero-crossing cycle detection processor circuit 31 for reading the PWM data $D_p$.

That is, assuming that the read address of the PWM data $D_p$ is m, the sampling number in a half cycle is N, a discrete time is n, and the PWM data $D_p'$ taken out of the PWM memory 24 at the discrete time n is $Y_{(n)}$, then the read address designation signal C is an address designation signal satisfying the equations as follows:

$$m = int(g\_rate \times g\_count) \quad (1)$$

$$g\_count = n \bmod N \quad (2)$$

$$Y_{(n)} = D_{pm} = D_p' \quad (3)$$

where n mod N represents a remainder obtained by dividing n by N, and int(g_rate×g_count) represents the integer part of (g_rate×g_count).

The PWM data $D_p'$ read from the PWM memory 24 based on the thus set read address designation signal C is inputted to the timer counter circuit 11. Then, based on this PWM data $D_p'$, the timer counter circuit 11 generates a gate pulse signal $G_p'$ and outputs the signal to the gate drive circuit 12. The gate drive circuit 12 switchingly controls the inverter main circuit 4 by the inputted gate pulse signal $G_p'$.

Figure 7:
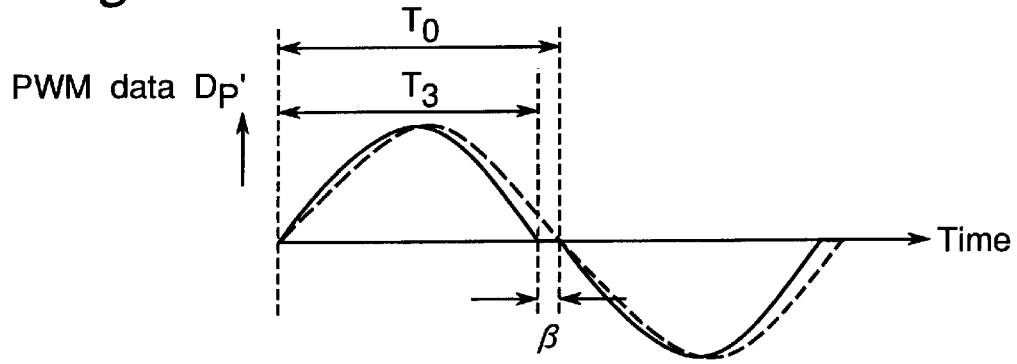
FIG. 7 is a chart showing a first example of the apparent waveform of the PWM data.

In this case, when g_rate>1, a distortion for zeroing the output in a specified interval β which terminates at the zero-crossing point as indicated by the solid line in FIG. 7 is imparted to the inverter output waveform, so that the apparent cycle $T_3$ of the PWM data $D_p'$ is made shorter than the cycle $T_0$ of the rated frequency $f_o$. When the inverter output is generated on the basis of this PWM data $D_p'$, the detection timing of the zero-crossing point is advanced by the interval β. Consequently, the frequency of the inverter output is made greater than the rated frequency $f_o$.

Figure 8:
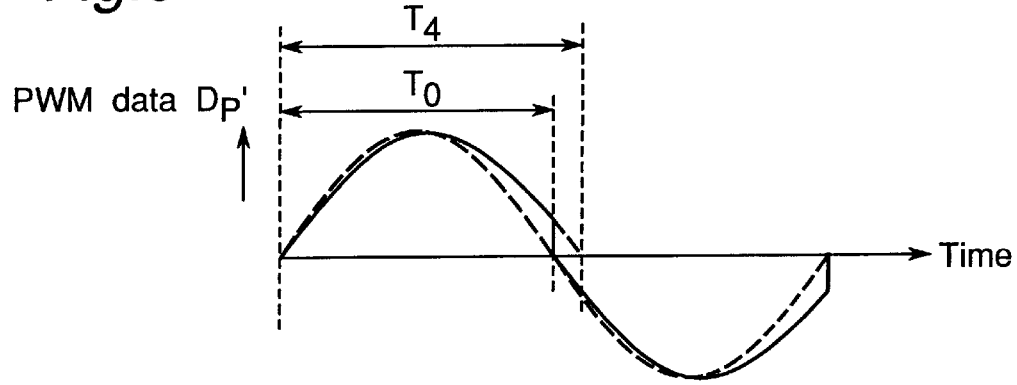
FIG. 8 is a chart showing a second example of the apparent waveform of the PWM data.

When g_rate<1, a distortion for outputting a specified output on the descending waveform path side which transits from a wave peak to the zero-crossing point as indicated by the solid line in FIG. 8 is imparted to the inverter output waveform, so that the apparent half cycle $T_4$ of the PWM data $D_p'$ is made longer than the cycle $T_0$ of the rated frequency $f_o$. When the inverter output is generated on the basis of this PWM data $D_p'$, the detection timing of the zero-crossing point is retarded by virtue of the prolongation of the apparent half cycle $T_4$. Consequently, the frequency of the inverter output is made smaller than the rated frequency $f_o$.

Such a frequency variation occurs even when the power factor of the load impedance is approximately one. Therefore, by detecting such a frequency variation or the voltage variation attendant on the frequency variation by the zero-crossing cycle detection processor circuit 31 or the voltage abnormality detector circuit 10, the islanding operation is surely detected.

Figure 9:
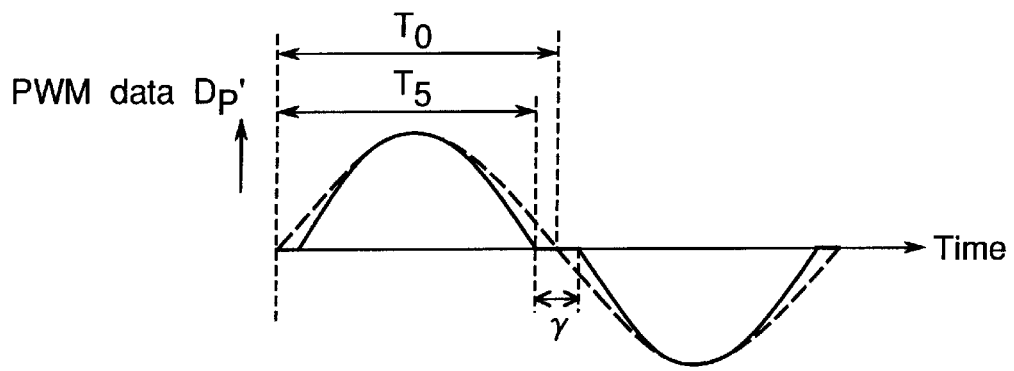
FIG. 9 is a chart showing a third example of the apparent waveform of the PWM data.

The way of distorting the inverter output waveform by the inverter apparatus 30 may be achieved by distorting the inverter output waveform so that a zero output level is achieved in a specified interval γ including the zero-crossing point and its both sides as indicated by the solid line in FIG. 9 instead of the ways shown in FIGS. 7 and 8. With this arrangement, the apparent half cycle $T_5$ of the PWM data $D_p'$ is made shorter than the half cycle $T_0$ of the rated frequency $f_o$. Consequently, the frequency of the inverter output (load supply voltage $V_o$) varies from the rated frequency $f_o$.

Figure 10:
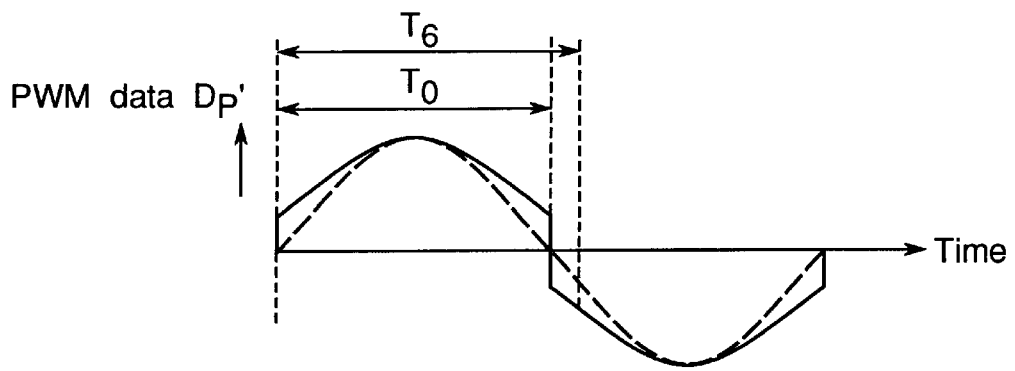
FIG. 10 is a chart showing a fourth example of the apparent waveform of the PWM data.

Further, as indicated by the solid line in FIG. 10, the inverter output waveform may be distorted so that it has a high level and a low level in the proximity of both sides of the zero-crossing point. With this arrangement, the apparent half cycle $T_6$ of the PWM data $D_p'$ is made longer than the half cycle $T_0$ of the rated frequency $f_o$. Consequently, the frequency of the inverter output varies from the rated frequency $f_o$.

In order to distort the inverter output waveform as shown in FIGS. 9 and 10, it is proper to change the function for designating the read address of the read address designation signal C. It is to be noted that the solid line indicates the apparent output waveform of the PWM data $D_p'$ and the dotted line indicates the output waveform of the rated frequency $f_o$ in each of FIGS. 7 through 10.

The frequency of the inverter output when the inverter apparatus 30 is in the islanding operation is also influenced by the type of the load 3 connected to the inverter apparatus 30. When the load 3 is an inductive load, the inverter output frequency in the islanding operation stage increases. When the load 3 is a capacitive load, the inverter output frequency in the islanding operation stage decreases. Therefore, in the case where the amount of frequency variation due to the impartation of the distortion to the inverter output waveform and the amount of frequency variation due to the load 3 have absolute values equivalent to each other and opposite directions of variation or in a similar case, the frequency variation due to the impartation of the distortion and the frequency variation due to the load 3 sometimes cancel each other, therefore hardly causing a frequency variation.

Figure 11:
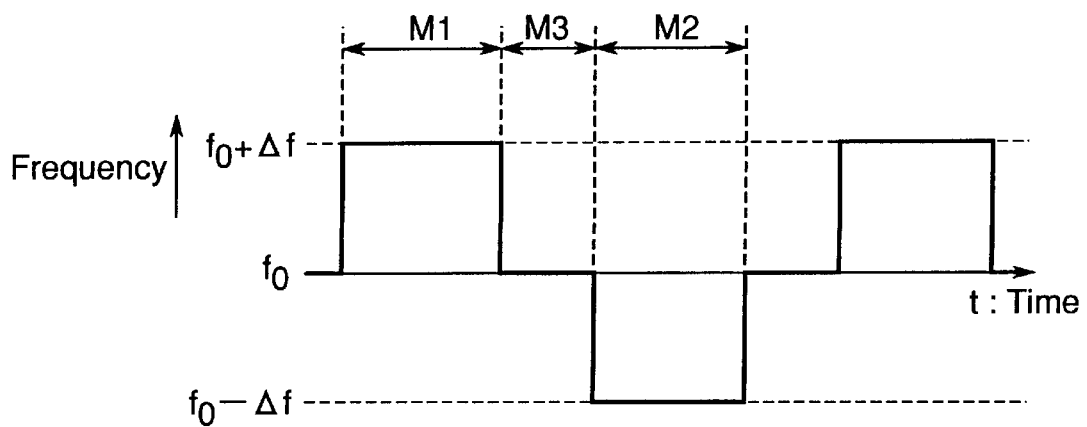
FIG. 11 is a chart showing an example of the variation of the inverter output frequency.

To cope with the above, this inverter apparatus 30 can increase or decrease the inverter output frequency relative to the rated frequency $f_o$ depending on how the increase rate (g_rate) of the count value (g_count) of the counter for taking out data in the zero-crossing cycle detection processor circuit 31 is set as described above. Therefore, in the zero-crossing cycle detection processor circuit 31 of the inverter apparatus 30, as shown in FIG. 11, a period M1 in which a first distortion (see FIG. 7) for causing the inverter output frequency to increase by a specified variation width $\Delta f$ is imparted and an interval M2 in which a second distortion (see FIG. 8) for causing the inverter output frequency to decrease by a specified variation width $\Delta f$ is imparted are set alternately repetitively. Therefore, the inverter output frequency alternately repeats the increase and decrease. Even when the frequency varying effect due to the impartation of the distortion and the frequency varying effect due to the load 3 cancel each other in a certain period M1 (M2), they stop cancelling each other in the next period M2 (M1), so that the inverter output frequency surely varies. Therefore, the islanding operation state is surely detected regardless of the power balance with respect to the load 3.

Furthermore, in the zero-crossing cycle detection processor circuit 31 of this inverter apparatus 30, a distortion non-impartation period M3 in which the rated frequency $f_o$ is maintained is provided between the period M1 in which the first distortion is imparted and the period M2 in which the second distortion is imparted. With this arrangement, a distortion hardly occurs in the load supply voltage $V_o$ in the normal operating state of the inverter apparatus 30, i.e., in the state in which the inverter apparatus is operating at the rated frequency $f_o$ in interconnection with the AC power system 16.

As the periods M1 and M2 in which the first and second distortions are imparted, for example, seven cycles of the inverter output frequency are appropriate. As the distortion non-impartation period M3, three cycles of the inverter output frequency are appropriate. As the variation width $\Delta f$, for example, ±0.2 Hz is appropriate. However, these values are mere examples, and therefore, it is a matter of course that the variation width $\Delta f$ of the periods M1, M2 and M3 may have another value. Furthermore, it is a matter of course that the distortion non-impartation period M3 produces a similar effect when it is set in the inverter apparatus 1 of the first embodiment.

Figure 12:
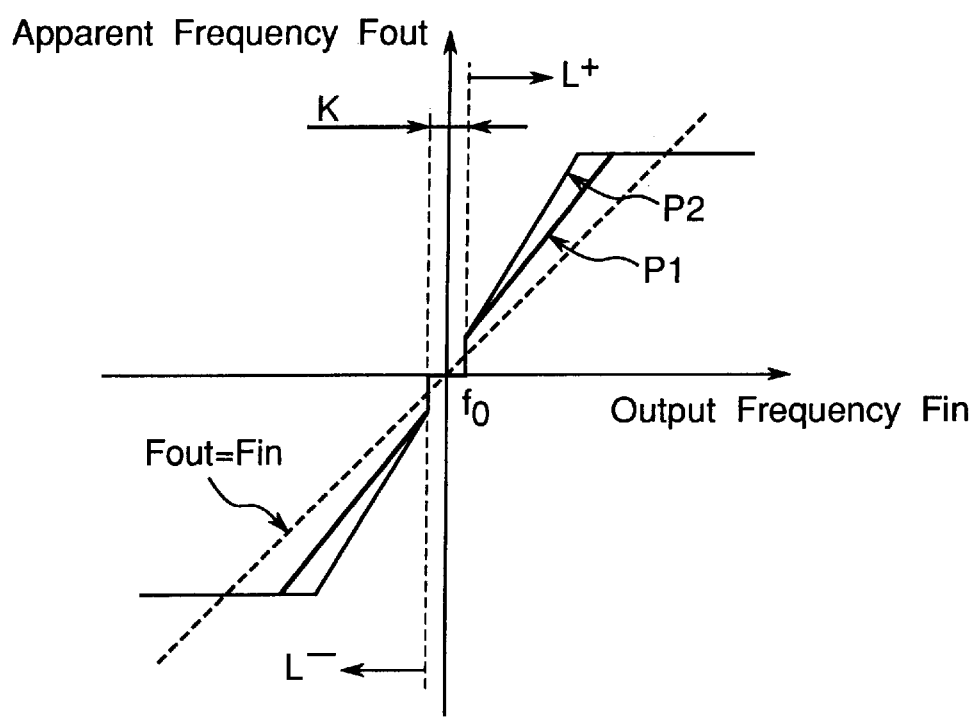
FIG. 12 is a graph showing an example of the positive feedback loop to be used for controlling the inverter output frequency.

Furthermore, this inverter apparatus 30 controls the inverter output so that a positive feedback loop is formed as shown in FIG. 12. In FIG. 12, the axis of abscissas represents the output frequency (corresponding to the frequency of the inverter output in the islanding operation stage of the inverter apparatus 30) $F_{in}$ of the load supply voltage $V_o$ detected by the zero-crossing cycle detection processor circuit 31, while the axis of ordinates represents the apparent frequency $F_{out}$ of the PWM data $D_p{}'$. As is evident from this figure, the inverter apparatus 30 (concretely the zero-crossing cycle detection processor circuit 31) divides the frequencies of the load supply voltage $V_o$ into a dead band K that is a specified frequency period (for example, a period of ±0.2 Hz is appropriate, however, the period is not limitative) extending on both sides of the rated frequency $f_o$, a positive side abnormal frequency region $L^+$ that is a frequency region higher than the dead band K and a negative side abnormal frequency region $L^-$ that is a frequency region lower than the dead band K.

Then, in the dead band K, the period M1 in which the first distortion (see FIG. 7) for increasing the inverter output frequency shown in FIG. 11 is imparted, the distortion non-impartation period M3 and the period M2 in which the second distortion (see FIG. 8) for decreasing the inverter output frequency is imparted are sequentially alternately set in the dead band K. Furthermore, in the abnormal frequency region $L^+$, the apparent frequency $F_{out}$ of the PWM data $D_p{}'$ formed on the basis of the frequency $F_{in}$ of the load supply voltage $V_o$ is made higher than the output frequency $F_{in}$. Then, this operation is repeated. Therefore, in this abnormal frequency region $L^+$, the PWM data $D_p{}'$ is generated in a positive feedback loop and used for executing the inverter control. Furthermore, in the abnormal frequency region $L^-$, the PWM data $D_p{}'$ is generated and used for executing the inverter control while forming a positive feedback loop such that the apparent frequency $F_{out}$ of the PWM data $D_p{}'$ formed on the basis of the frequency $F_{in}$ of the load supply voltage $V_o$ is made lower than the output frequency $F_{in}$. The above control is executed by changing the function for designating the read address of the read address designation signal C based on the load supply voltage $V_o$.

By executing the above control, a frequency variation rapidly occurs in the frequency of the load supply voltage $V_o$ in the islanding operation stage. That is, the power factor of the load impedance is approximately one in the islanding operation stage of the inverter apparatus 30. Therefore, although the load supply voltage $V_o$ did not deviate from the dead band K in the conventional case, the imparted supply voltage deviates from the dead band K and shifts into the abnormal frequency region $L^+$ or $L^-$ by imparting the first distortion and the second distortion to the inverter output according to this embodiment. When the load supply voltage $V_o$ shifts into the abnormal frequency region $L^+$ or $L^-$, the frequency variation is accelerated as a consequence of the frequency control in the positive feedback loop. Therefore, when the inverter apparatus 30 starts the islanding operation, the operation is speedily detected by the zero-crossing cycle detection processor circuit 31 and the voltage abnormality detector circuit 10.

Furthermore, in this inverter apparatus 30, as shown in FIG. 12, when the frequency of the load supply voltage $V_o$ stays in the abnormal frequency region $L^+$ or $L^-$, the slope of the positive feedback loop is changed so that the amount of variation of the apparent frequency $F_{out}$ relative to the output frequency $F_{in}$ is increased. That is, by measuring the period in which the output frequency $F_{in}$ is in the abnormal frequency region $L^+$ or $L^-$, the zero-crossing cycle detection processor circuit 31 executes the control of the apparent frequency $F_{out}$ based on a straight line P1 having a relatively gradual slope when the output frequency $F_{in}$ does not exceed a predetermined period (for example, a period of five cycles of $F_{in}$ is appropriate, however, this period is not limitative) or executes the control of the apparent frequency $F_{out}$ based on a straight line P2 having a relatively steep slope when the output frequency $F_{in}$ exceeds the predetermined period. By this operation, the frequency variation of the output frequency $F_{in}$ that has shifted into the abnormal frequency region $L^+$ or $L^-$ can be appropriately accelerated, and when the inverter apparatus 30 starts the islanding operation, the islanding operation can be more speedily detected by the zero-crossing cycle detection processor circuit 31 and the voltage abnormality detector circuit 10.

Furthermore, as described above, it can be considered that the frequency of the load supply voltage $V_o$ may be varied by the effect on the load 3 side depending on whether the load 3 is an inductive load or a capacitive load or by a similar factor and the frequency variation due to the load 3 and the frequency variation due to the impartation of the distortion may cancel each other. If such a phenomenon occurs, the varying speed of the frequency of the load supply voltage $V_o$ is made slow, to a disadvantage. However, as shown in FIG. 12, by virtue of the scheme of switching between the two straight lines P1 and P2, even when the varying speed of the output frequency is made slow through the cancellation with the frequency variation due to the load 3 in the positive feedback control based on the straight line P1 having the relatively gradual slope, the switching of the operation to the positive feedback control based on the straight line P2 having the relatively steep slope eliminates this relation of cancellation, so that the output frequency varies greatly.

Although the distortion is imparted to the PWM data $D_p'$ read from the PWM memory 24 in this inverter apparatus 30, it is otherwise acceptable to impart a distortion to the current reference waveform data $W_b$ taken out of the current reference waveform memory 19. In this case, it is proper to output a read address designation signal corresponding to the aforementioned read address designation signal C from the zero-crossing cycle detection processor circuit 31 to the current reference waveform memory 19. This read address designation signal is to impart the distortion to the current reference waveform data $W_b$ by changing every zero-crossing cycle the increase rate (g_rate) of the count value (g_count) of a counter for reading use in reading the current reference waveform data $W_b$.

Figure 13:
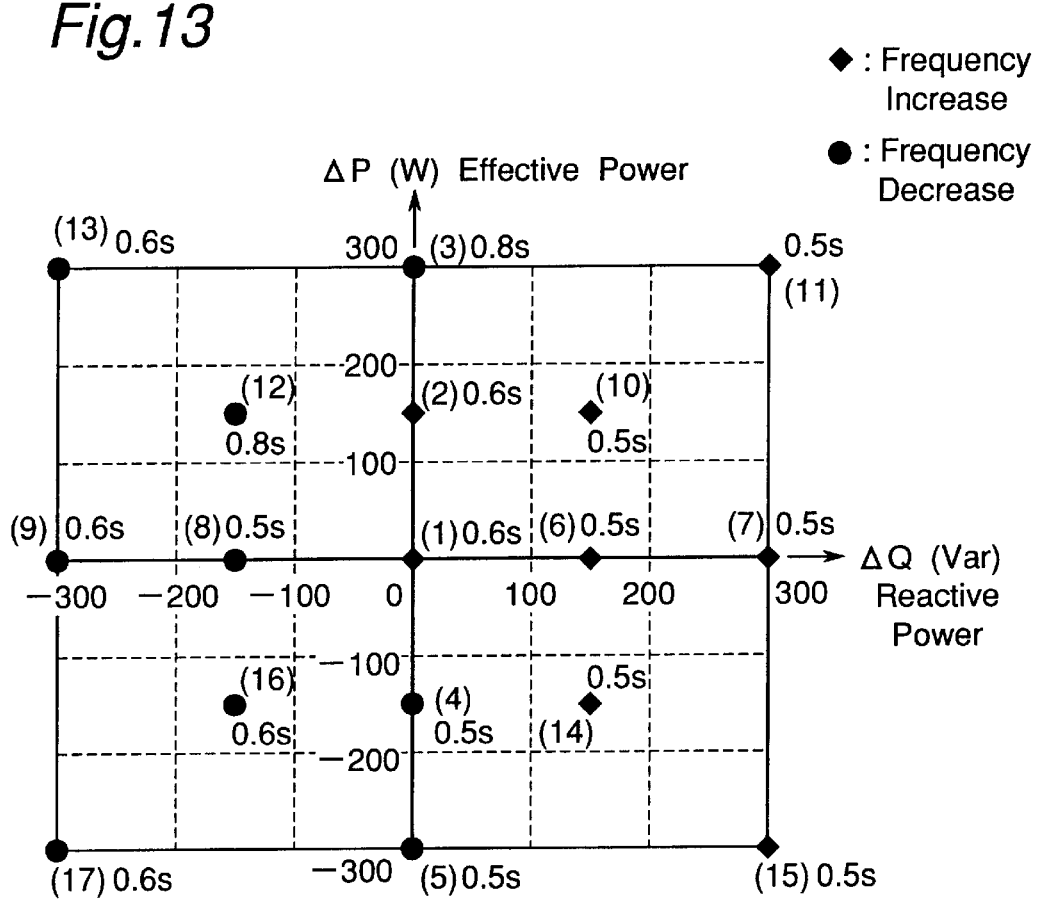
FIG. 13 is a graph showing a measurement result of an islanding operation detecting operation of the inverter apparatus of the present invention.
Figure 14:
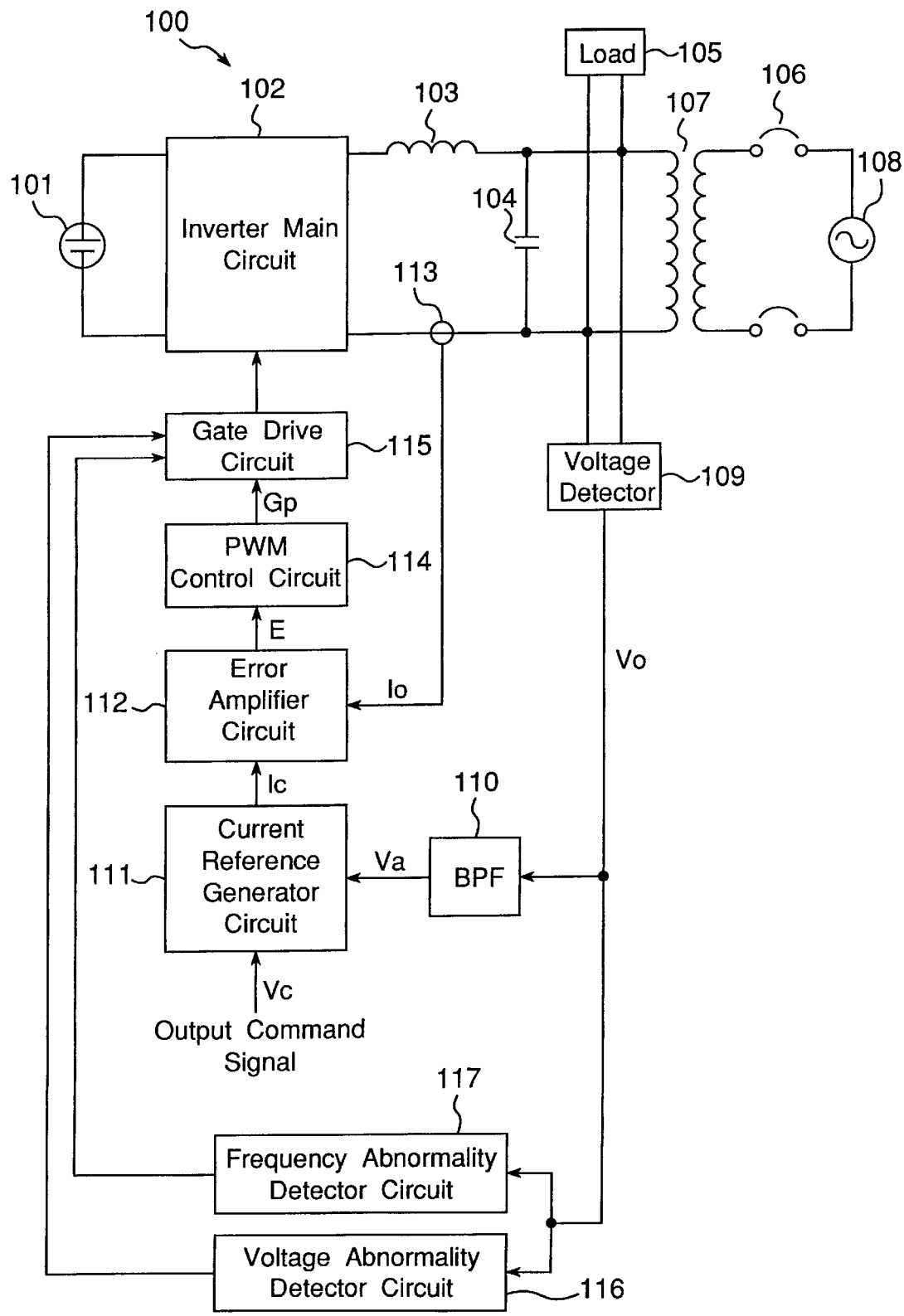
FIG. 14 is a block diagram showing the construction of a conventional inverter apparatus.
Figure 15A:
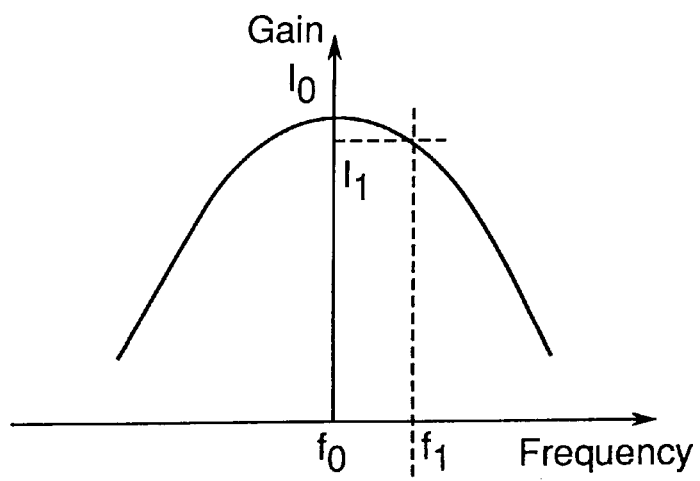
FIGS. 15A and 15B are graphs showing relations of the amplitude and phase of a current reference signal relative to the load supply voltage.
Figure 15B:
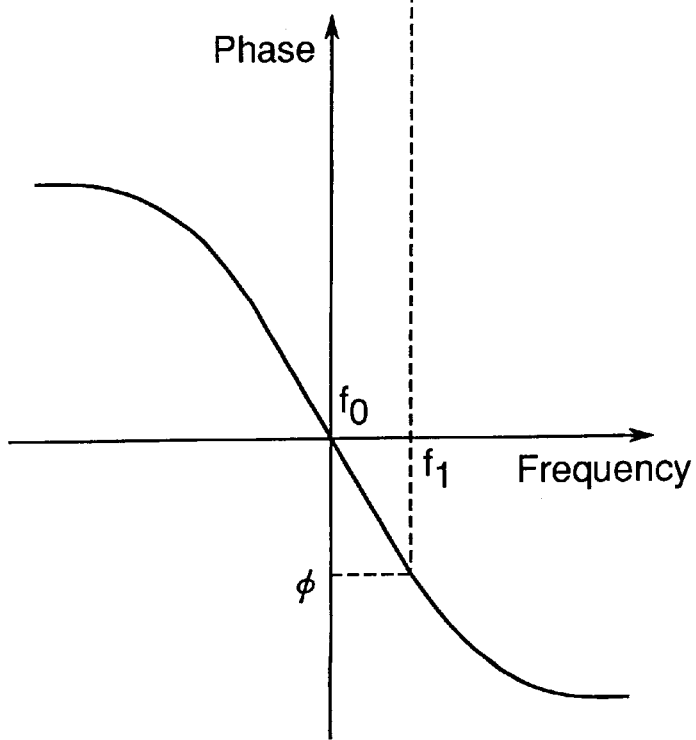

FIG. 13 shows a measurement result obtained by setting a condition such that the load power is balanced with respect to the inverter rated output (3 kW) or the balanced state collapses within a certain range (±300 W, ±300 Var) and measuring how much time is required for the inverter apparatus of the present invention to detect the islanding operation in the stage of a power failure of the AC power system 16. In FIG. 13, the balanced state and the state in which the balanced state is collapsed are expressed by a difference between the inverter output and the load power, where the axis of ordinates represents the state of the active power. In this case, each value on the axis represents a value obtained by subtracting the load power from the inverter output, and it is shown that the active power is balanced when the value on the axis represents zero and the balanced state is collapsed by the numerical value in the cases of the other values. On the other hand, the axis of abscissas represents the state of the reactive power. The measurement was performed at each of the points (1) through (17) in FIG. 13, and the time required for the inverter apparatus of the present invention to start detecting the islanding operation and then stop the operation is entered beside each point.

As is apparent from FIG. 13, it can be understood that the inverter apparatus of the present invention can surely detect the islanding operation either in the load balanced state (when the power factor of the load inverter is one) or in the proximity of the balanced state (when the power factor is proximate to one).

According to the present invention, the distortion for causing a variation in the output frequency of the inverter apparatus in the islanding operation stage is imparted to the inverter output waveform. With this arrangement, even when the power factor of the load impedance of the inverter output is proximate to one, a frequency variation is surely generated in the inverter output when the inverter apparatus is disconnected from the AC power system. Therefore, by detecting this frequency variation, the islanding operation of the inverter apparatus can be surely detected regardless of the power balance with respect to the load.

Furthermore, the distortion is merely imparted without detecting the distortion in contrast to the background art, and the impartation of the distortion can be easily performed through software processing by DSP or the like. Therefore, the construction can be simplified by that much, allowing a cost reduction to be achieved.

According to an embodiment, the distortion is imparted to the inverter output waveform at the zero-crossing point and its proximity. With this arrangement, the frequency variation of the inverter output is surely generated, thereby allowing the islanding operation state to be more surely detected by that much.

According to an embodiment, the distortion non-impartation period is intermittently provided. With this arrangement, in the normal operating state of the inverter apparatus, i.e., in the state in which the inverter apparatus is operating in interconnection with the AC power system, a distortion hardly occurs in the load supply voltage, thereby eliminating almost all the disadvantages due to the impartation of the distortion in the normal operating stage in interconnection with the AC power system.

According to an embodiment, the distortion which causes the zero output level in the specified period which terminates at the zero-crossing point is imparted to the inverter output waveform. With this arrangement, the frequency of the inverter output surely varies, and by detecting this frequency variation, the islanding operation state can be speedily detected regardless of the power balance with respect to the load.

According to an embodiment, the distortion which yields an output on a descending side of the waveform extending from a peak of the waveform to the zero-crossing point is imparted to the inverter output waveform. With this arrangement, the frequency of the inverter output surely varies, and by detecting this frequency variation, the islanding operation state can be speedily detected regardless of the power balance with respect to the load.

According to an embodiment, a distortion which causes a zero output level in a specified interval including the zero-crossing point and its both sides is imparted to the inverter output waveform. With this arrangement, the frequency of the inverter output surely varies, and by detecting this frequency variation, the islanding operation state can be speedily detected regardless of the power balance with respect to the load.

According to an embodiment, a distortion which yields outputs respectively increased into wave peak sides of the waveform on both sides of the zero-crossing point is imparted to the inverter output waveform. With this arrangement, the frequency of the inverter output surely varies, and by detecting this frequency variation, the islanding operation state can be speedily detected regardless of the power balance with respect to the load.

According to an embodiment, the inverter output frequency is allowed to be increased and decreased alternately repetitively. With this arrangement, the islanding operation state can be surely detected regardless of the balance of the frequency variation due to the impartation of the distortion with the frequency variation due to the load.

According to an embodiment, the distortion is imparted to the inverter output waveform so that the inverter output frequency varies in the positive feedback loop according to the frequency variation of the inverter output. With this arrangement, the inverter output frequency speedily varies, and this ensures the detection of the islanding operation state.

According to an embodiment, when the islanding operation detecting system detects the event that the inverter output frequency is staying in the abnormal frequency region, the gain adjusting system increases the gain of the positive feedback loop of the distortion imparting system. With this arrangement, the inverter output frequency varies more speedily, and this further ensures the detection of the islanding operation state.

According to an embodiment, the inverter output frequency increases and decreases alternately repetitively even in the dead band, or the region in which the frequency is stabilized, so that it shifts into the region in which the frequency variation occurs in the positive feedback loop. Therefore, even when the inverter output frequency is located in the dead band in the initial stage, it is speedily detected, and this further ensures the detection of the islanding operation state.

According to an embodiment, by imparting a distortion to the current reference, a distortion is also generated in the PWM data formed through the pulse width modulation. In the islanding operation stage, a variation surely occurs in the inverter output frequency due to the distortion generated in the PWM data, and this frequency variation is detected. Therefore, the detection of the islanding operation is further ensured.

According to an embodiment, the distortion imparting system imparts a distortion directly to the PWM data. Therefore, a variation is speedily generated in the inverter output frequency, and this further ensures the detection of the islanding operation state.

According to an embodiment, the inverter output is reduced when the inverter output frequency is deviated from the rated frequency. With this arrangement, the variation of the inverter output frequency is promoted, so that the detection of the islanding operation state is advanced, and the inverter apparatus that has entered in the islanding operation state can be safely stopped.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An inverter apparatus islanding operation detecting method for detecting an event when an inverter apparatus, which converts an output of a direct current power source into an alternating current through waveform control synchronized with a zero-crossing point and supplies the alternating current as an output waveform to a load in interconnection with an alternating current power system, has been dissociated from the alternating current power system and has started an islanding operation, comprising:
    imparting to the output waveform of the inverter apparatus a distortion for causing a frequency variation in the output waveform during an islanding operation stage of the inverter apparatus; and
    detecting the islanding operation stage of the inverter apparatus by detecting the frequency variation of the output waveform caused by the distortion or a variation in the output waveform attributed to the frequency variation.

2. An inverter apparatus comprising:
    an inverter main circuit for converting an output of a direct current power source into an alternating current and supplying the alternating current as an output waveform to a load in interconnection with an alternating current power system;
    an inverter control system for controlling the converting operation of said inverter main circuit by waveform control synchronized with a zero-crossing point of the output waveform of said inverter main circuit;
    an islanding operation detecting system for detecting an islanding operation of said inverter main circuit by detecting a frequency variation generated in the output waveform of said inverter main circuit when said inverter main circuit is dissociated from the alternating current power system and enters into the islanding operation or a variation in the output waveform of said inverter main circuit attributed to the frequency variation; and
    a distortion imparting system for imparting a distortion for causing the frequency variation in the output waveform of said inverter main circuit during the islanding operation.

3. The inverter apparatus as claimed in claim 2, wherein said distortion imparting system imparts the distortion to the zero-crossing point and proximity of the output waveform.

4. The inverter apparatus as claimed in claim 2, wherein said distortion imparting system intermittently provides a distortion non-impartation period.

5. The inverter apparatus as claimed in claim 2, wherein said distortion imparting system imparts to the output waveform a distortion which causes a zero output level in a specified interval that terminates at a zero-crossing point.

6. The inverter apparatus as claimed in claim 2, wherein said distortion imparting system imparts to the output waveform a distortion which yields an output on a descending side of the output waveform extending from a peak of the output waveform to a zero-crossing point.

7. The inverter apparatus as claimed in claim 2, wherein said distortion imparting system imparts to the output waveform a distortion which causes a zero output level in a specified interval including a zero-crossing point and both sided of the zero-crossing point.

8. The inverter apparatus as claimed in claim 2, wherein said distortion imparting system imparts to the output waveform a distortion which yields outputs respectively increased into wave peak sides of the output waveform on both sides of a zero-crossing point.

9. The inverter apparatus as claimed in claim 2, wherein said distortion imparting system alternately repetitively imparts to the output waveform a first distortion which causes a frequency of the output waveform to increase during the islanding operation and a second distortion which causes the frequency of the output waveform to decrease during the islanding operation.

10. The inverter apparatus as claimed in claim 2, wherein said inverter control system forms PWM data through pulse width modulation based on a component of an error between a current reference and the output waveform of said inverter main circuit and controls said inverter main circuit according to the formed PWM data, and
    said distortion imparting system imparts a distortion to the current reference to impart the distortion to the output waveform.

11. The inverter apparatus as claimed in claim 2, wherein said inverter control system forms PWM data through pulse width modulation based on a component of an error between a current reference and the output waveform of said inverter main circuit and controls said inverter main circuit according to the formed PWM data, and said distortion imparting system imparts a distortion to the PWM data to impart the distortion to the output waveform.

12. The inverter apparatus as claimed in claim 2, further comprising an output reducing system for reducing the waveform output when said islanding operation detecting system detects an event that the frequency of the output waveform is deviated from a rated frequency.

13. An inverter apparatus comprising:

an inverter main circuit for converting an output of a direct current power source into an alternating current and supplying the alternating current as an output waveform to a load in interconnection with an alternating current power system;

an inverter control system for controlling the converting operation of said inverter main circuit by waveform control synchronized with a zero-crossing point of the output waveform of said inverter main circuit;

an islanding operation detecting system for detecting an islanding operation of said inverter main circuit by detecting a frequency variation generated in the output waveform of said inverter main circuit when said inverter main circuit is dissociated from the alternating current power system and enters into the islanding operation or a variation in the output waveform of said inverter main circuit attributed to the frequency variation; and a distortion imparting system for imparting a distortion to the output waveform of said inverter main circuit so that frequency of the output waveform varies in a positive feedback loop according to the frequency variation of the output waveform.

14. The inverter apparatus as claimed in claim 13, further comprising a gain adjusting system for increasing a gain of the positive feedback loop of said distortion imparting system when said islanding operation detecting system detects an event that the frequency of the output waveform stays in an abnormal frequency region.

15. The inverter apparatus as claimed in claim 13, wherein said distortion imparting system has a dead band in the positive feedback loop at and around a rated frequency, and alternately repetitively imparts to the output waveform, during the dead band, a first distortion which causes the frequency of the output waveform to increase during the islanding operation and a second distortion which causes the frequency of the output waveform to decrease during the islanding operation.

16. The inverter apparatus as claimed in claim 13 wherein said inverter control system forms PWM data through pulse width modulation based on a component of an error between a current reference and the output waveform of said inverter main circuit and controls said inverter main circuit according to the formed PWM data, and said distortion imparting system imparts a distortion to the current reference to impart the distortion to the output waveform.

17. The inverter apparatus as claimed in claim 13, wherein said inverter control system forms PWM data through pulse width modulation based on a component of an error between a current reference and the output waveform of said inverter main circuit and controls said inverter main circuit according to the formed PWM data, and said distortion imparting system imparts a distortion to the PWM data to impart the distortion to the output waveform.

18. The inverter apparatus as claimed in claim 13, further comprising an output reducing system for reducing the waveform output when said islanding operation detecting system detects an event that the frequency of the output waveform is deviated from a rated frequency.

* * * * *